United States Patent [19]
Moeller

[11] 4,291,668
[45] Sep. 29, 1981

[54] GRIDDLE VENTILATING SYSTEM

[76] Inventor: Erwin W. Moeller, 1839 Robertson Ave., Galesburg, Ill. 61401

[21] Appl. No.: 17,415

[22] Filed: Mar. 5, 1979

[51] Int. Cl.³ .................. F24C 3/00; F24C 15/20; F24F 9/00
[52] U.S. Cl. .................. 126/41 R; 126/299 R; 98/115 R
[58] Field of Search .................. 126/41, 299 R, 299 F, 126/299 D; 98/115 R, 115 LH, 115 SB, 36

[56] References Cited
U.S. PATENT DOCUMENTS

| | | | |
|---|---|---|---|
| Re. 22,228 | 12/1942 | Petersen | 126/299 R |
| 2,933,080 | 4/1960 | Adey | 126/299 F |
| 3,115,818 | 12/1963 | Smith | 98/36 |
| 3,303,839 | 2/1967 | Tavan | 126/299 D |
| 3,350,994 | 11/1967 | Guibert | 98/36 |
| 3,409,005 | 11/1968 | Field | 126/299 R |
| 3,412,530 | 11/1968 | Cardiff | 126/299 D |
| 3,530,784 | 7/1970 | Bowen | 126/299 D |
| 3,585,919 | 6/1971 | Culpepper, Jr. | 98/33 R |
| 3,785,124 | 1/1974 | Gaylord | 55/118 |
| 3,998,142 | 12/1976 | Foreman et al. | 98/36 |

*Primary Examiner*—Samuel Scott
*Assistant Examiner*—Wesley S. Ratliff, Jr.
*Attorney, Agent, or Firm*—Pravel, Gambrell, Hewitt, Kirk, Kimball & Dodge

[57] ABSTRACT

An apparatus for ventilating an indoor grill or griddle to prevent accumulation of smoke and odors. Collection inlets formed in wall members spaced around the grill draw the smoke away from the grill. A receiving chamber having a filter receives the vapor from the wall members and conducts it away from the grill.

9 Claims, 2 Drawing Figures

GRIDDLE VENTILATING SYSTEM

BACKGROUND OF INVENTION

1. Field of the Invention

The present invention relates to ventilating systems for indoor grills.

2. Description of Prior Art

So far as is known to applicant, prior vents for indoor grills or griddles have in the past used a large central open overhead cowl or hood through which a fan drew smoke and vapor from the grills. Examples are in U.S. Pat. Nos. 3,785,124; 3,585,919; 3,530,784; 3,303,839; 3,400,649; 3,601,036; and 2,375,913.

Other prior art indoor vent patents have related to vent structure specially designed for use with indoor ovens or ranges and thus not, so far as is known to applicant, suitable for use with grills. Examples of these type structure are in U.S. Pat. Nos. 2,672,137; 4,021,642; 3,494,350; 2,233,463; 3,926,171; 3,698,378; 3,762,394; 3,372,692; 3,327,610; 3,292,523; 3,131,688; 2,339,197; 1,717,851; 1,139,231; 1,060,228; 3,797,375; 4,042,806; 3,756,217; and 638,924.

A final group of prior art patents related to the structure of the indoor griddles and did not discuss vent structure for venting the griddle. These patents were U.S. Pat. Nos. 2,980,101; 3,317,709 and 3,842,276.

SUMMARY OF INVENTION

Briefly, the present invention provides a new and improved apparatus for ventilating an indoor grill or griddle mounted in a table or surface. A plurality of hollow, walled inlet arm members are mounted on the surface adjacent the grill about a portion of the periphery of the grill. Each of the inlet arm members has an elongate collection slot formed in one of its walls adjacent the grill to receive and conduct smoke and vapors away from the grill. A receiving chamber mounted with the surface adjacent the grill is in communication with the inlet arm members for receiving the smoke and vapors. An outlet connected to the receiving chamber transports the smoke and vapors upwardly from the receiving chamber and away from the grill to ventilate the grill.

DESCRIPTION OF THE PREFERRED EMBODIMENT

Figure 1:
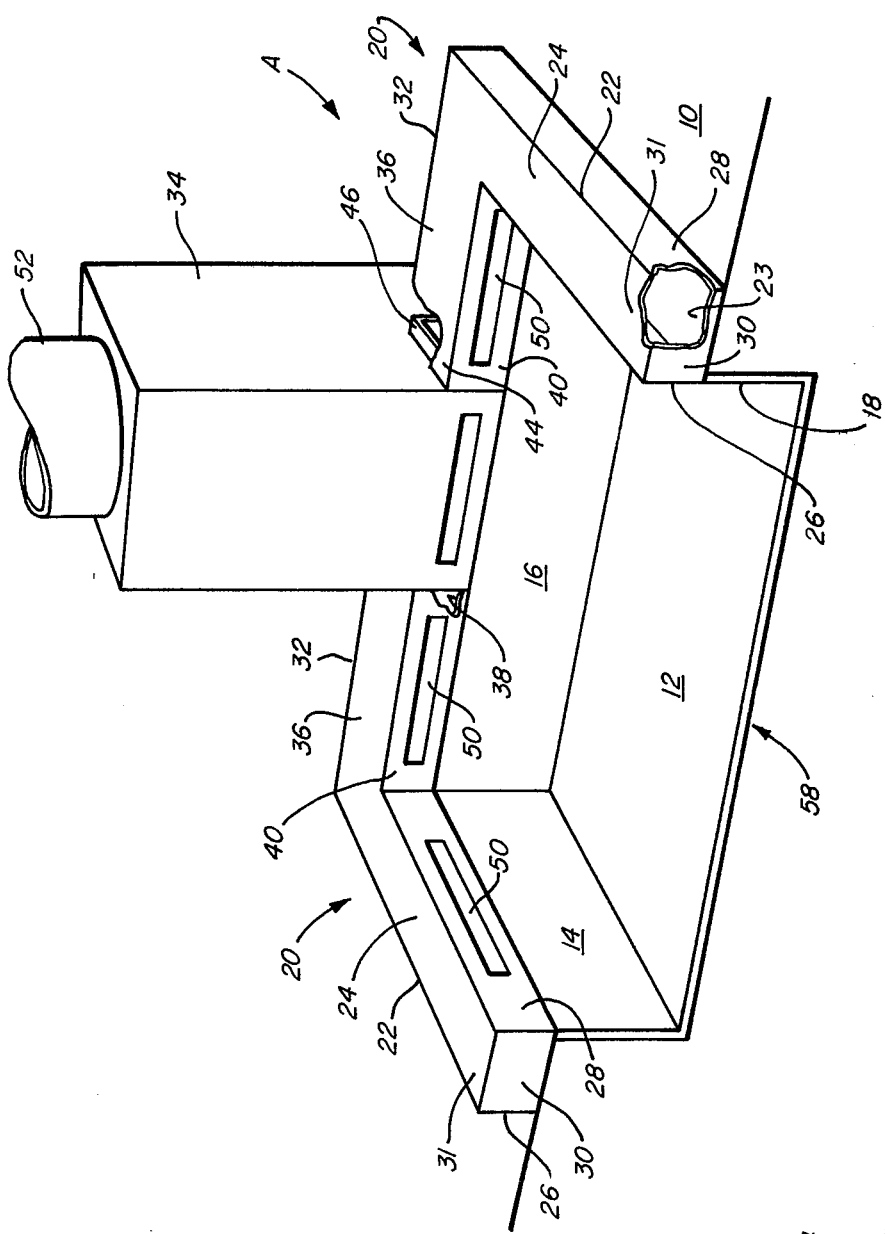
FIG. 1 is an isometric view, taken partly in cross-section, of a vent apparatus according to the present invention.
Figure 2:
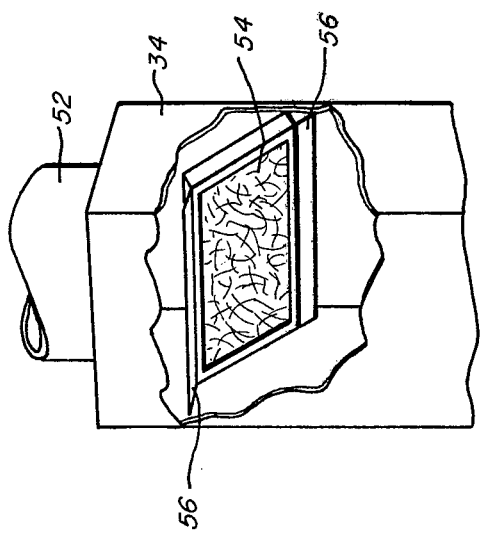
FIG. 2 is an isometric view of a portion of the apparatus of FIG. 1, with portions thereof removed so that other structure may more clearly be seen.

In the drawings, the letter A designates generally an apparatus according to the present invention mounted with a table or surface 10 adjacent a grill or griddle 12 within the interior of a room or building. In accordance with the present invention, the term grill or griddle is intended to mean a heated surface for cooking food. The grill 12 may be a mesh or open grill structure or may alternatively be a continuous, imperforate plate. Further, the grill 12 may be heated by gas or electricity. The grill 12 in the preferred embodiment is mounted at a recessed position below the table 10 by side walls 14 and 16 and a rear wall 18 of the grill 12.

The apparatus A of the present invention includes a plurality of hollow, walled inlet arm members 20 mounted on the surface 10 adjacent the periphery of grill 12 about the side walls 14 and 16 and the rear wall 18. Each of the inlet arm members 20 includes a side inlet arm 22 in the form of a rectangular enclosure mounted along a bottom wall 23 on the surface 10 and with a top wall 24 and side walls 26 and 28. An end enclosure 30 seals an outermost portion 31 of the inlet arm members 20.

The inlet arm members 20 are each connected by a base arm member 32 to a receiving chamber 34. The base arm members 32 in the preferred embodiment are of like rectangular configuration to the side inlet arms 22, having top walls 36, bottom walls 38 and side walls 40 and 42.

The base arm members 32 have an opening adjacent an end portion 44 to slidingly fit over and receive therein a mounting sleeve 46 extending outwardly from the receiving chamber 34. The engagement between the base arm members 32 and sleeve 46 of the receiving chamber 34 is sufficiently close so as to prevent escape of smoke and vapors therefrom.

The arm members 20 have elongate collection slots 50 formed in the side walls 28 of the side inlet arms 22 and also in the side walls 40 of the base arm members 32 adjacent the grill 12 to receive and conduct smoke and vapors away from the grill 12. The elongate collection slots 50 are preferred in place of a series of small perforations or holes for ease of cleaning of the apparatus A.

Smoke and vapors entering the collection slots 50 in the inlet arm 22 and base arm members 32 move therethrough into the receiving chamber 34 by way of the sleeve 46 under force exerted by a fan, typically mounted at or near an upper portion of an outlet tube or conduit 52. The conduit 52 may be of any suitable shape and is mounted above the receiving chamber 34 to receive the smoke and vapors collected in the receiving chamber 34 by way of the slots 50 in the inlet arms 20.

The receiving chamber 34 preferably also includes a filter member 54 mounted therein with suitable mounting structure 56 to remove particulate matter from the smoke and vapors being ventilated from the grill 12 by the apparatus A.

Where the apparatus A of the present invention is used in air-conditioned rooms or buildings, it is often desirable to supply forced feed air across the griddle 12 for energy conservation purposes. In these installations, a forced feed conduit may be installed across a front portion 58 of the grill 12 to direct the air thereacross.

With the apparatus A of the present invention, smoke and vapors from the grill 12 are drawn through the collection slots 50 and move from the arm members 20 into the receiving chamber 34 under force exerted by the fan. Smoke and vapors in the receiving chamber 34 move through the filter 54 into the outlet conduit 52 and are vented therefrom externally of the room or building in which the grill 12 is in use.

With the present invention, it is important to note that the collection slots 50 are formed along the sides of the grill 12 and thus smoke and vapors are less likely to move upwardly into a user's face or out into the room during cooking with the grill 12. Further, with the collection slots 50 substantially adjacent an upper surface of the grill 12, less distance is provided for the smoke and vapors to travel, preventing side drafts or gusts of air from moving the smoke and vapors away from the grill 12 prior to venting. Also, with the sleeve mounting 46 of the receiving chamber 34, the inlet arms 20 are easily removable for cleaning purposes.

The foregoing disclosure and description of the invention are illustrative and explanatory thereof, and various changes in the size, shape and materials as well as in the details of the illustrated construction may be made without departing from the spirit of the invention.

I claim:

1. A vent apparatus for ventilating an indoor grill or griddle mounted in a table or surface, comprising:
    (a) a plurality of hollow, walled inlet arm members mounted on the surface adjacent the grill about a portion of the periphery thereof;
    (b) said inlet arm members each having an elongate collection slot formed in a wall thereof adjacent the grill to receive and conduct smoke and vapors away from the grill;
    (c) a receiving chamber mounted with the surface and in communication with said inlet arm members for receiving smoke and vapors therefrom;
    (d) fan means for drawing smoke and vapors away from the grill into said inlet arm members and said receiving chamber; and
    (e) outlet means for transporting the smoke and vapors upwardly away from said receiving chamber to ventilate the grill.

2. The vent apparatus of claim 1, wherein the griddle has at least two sides, a front and a rear portion and each of said inlet arm members comprises:
    (a) a side inlet arm wall member mounted on the surface adjacent the sides of the griddle; and
    (b) a base arm member mounted on the surface along the rear portion and extending inwardly from said side inlet arm wall member to connect same with said receiving chamber.

3. The vent apparatus of claim 2, wherein each of said side inlet arm wall members and said base arm member has an elongate collection slot formed in a wall thereof adjacent the grill.

4. The vent apparatus of claim 2, wherein each of said elongate slots is formed extending substantially horizontally along said inlet arm members.

5. The vent apparatus of claim 2, further including:
    a mounting sleeve formed on said receiving chamber extending outwardly therefrom into said base arm member for removably mounting same with said receiving chamber.

6. The vent apparatus of claim 1, wherein the griddle has at least two sides, a front and a rear portion and each of said inlet arm members comprises:
    hollow, walled conduits being mounted adjacent the grill along the side and rear portions thereof.

7. The vent apparatus of claim 1, wherein said receiving chamber is a walled receptacle and is mounted on the surface adjacent the grill between said inlet arm members and further including:
    an elongate collection slot formed in a wall of said receiving chamber adjacent the grill to receive and conduct smoke and vapors from the grill.

8. The vent apparatus of claim 7, wherein said collection slots in said inlet arm members and said receiving chambers comprise the sole collection inlets of the vent apparatus.

9. A vent apparatus, for ventilating an indoor grill or griddle mounted in a table or surface, comprising:
    (a) a plurality of hollow, walled inlet arm members mounted on the surface adjacent the grill about a portion of the periphery thereof;
    (b) said inlet arm members each having a elongate collection slot formed in a wall thereof adjacent the grill to receive and conduct smoke and vapors away from the grill;
    (c) a receiving chamber mounted with the surface and in communication with said inlet arm members for receiving smoke and vapors therefrom;
    (d) fan means for drawing smoke and vapors away from the grill into said inlet arm members and said receiving chamber;
    (e) outlet means for transporting the smoke and vapors upwardly away from said receiving chamber to ventilate the grill; and
    (f) filter means mounted between said receiving chamber and said outlet means for filtering the smoke and vapors collected from the grill.

* * * * *